United States Patent [19]

Zuefferey

[11] Patent Number: 5,266,797
[45] Date of Patent: Nov. 30, 1993

[54] OPTO-ELECTRONIC SENSOR FOR THE MEASUREMENT OF LINEAR VALUES USING ADJACENT EMITTED-DETECTOR PAIR AND FOCUSING AND DEVIATING MEANS

[75] Inventor: Charles-Henri Zuefferey, Lausanne, Switzerland

[73] Assignee: Tesa S.A., Switzerland

[21] Appl. No.: 809,945

[22] Filed: Dec. 18, 1991

[30] Foreign Application Priority Data

Jan. 22, 1991 [CH] Switzerland ............... 00173/91

[51] Int. Cl.$^5$ ............................................. H01J 3/14
[52] U.S. Cl. ............................ 250/237 G; 250/231.14
[58] Field of Search ............. 250/237 G, 216, 231.14, 250/231.15, 231.16, 231.17, 231.18; 356/373, 374, 375

[56] References Cited

U.S. PATENT DOCUMENTS 4,983,828 1/1991 Stephens .................... 250/237 G
5,064,290 12/1991 McMurtry et al. ............ 250/237 G Primary Examiner—David C. Nelms
Assistant Examiner—K. Shami
Attorney, Agent, or Firm—Anthony J. Casella; Gerald E. Hespos

[57] ABSTRACT

The sensor has at least one sensor unit arranged opposite an incremental measurement scale (1) with reflecting graduation (2). The sensor unit comprises a photoemitter (3) and an adjacent photoreceiver (4), located in a printed circuit (6), with optical axes (xx') parallel to each other and perpendicular to the plane of the scale (1), and an optical group (9) with two focusing lenses (10, 12) and two deflection faces (11, 13) integrated by molding in a support of transparent synthetic material. In the optical group, one of the two lenses and one of the two deflection faces are aligned on each of the two said optical axes (x, x') in order to direct and deviate the light rays coming from the photoemitter (3) and to recover them on the photoreceiver (4) after their passage through a graduated sensing graticule (14).

2 Claims, 1 Drawing Sheet

OPTO-ELECTRONIC SENSOR FOR THE MEASUREMENT OF LINEAR VALUES USING ADJACENT EMITTED-DETECTOR PAIR AND FOCUSING AND DEVIATING MEANS

The present invention has as its object an opto-electronic sensor for the measurement of linear values by reflection of light rays comprising at least one sensor unit arranged on one side of and facing an incremental measurement scale with reflecting graduation and comprising an opto-electronic photoemitter arranged so as to irradiate the reflecting graduation of the scale, a graduated graticule arranged so as to sense the light rays reflected by the graduation of the scale and an opto-electronic photoreceiver arranged so as to detect the light rays reflected through the graticule.

In the known sensors of this type, the photoemitter and the photoreceiver are arranged so as to have their optical axis converge on the reflecting graduation of the scale and symmetrical with respect to the normal to it, so that the light emitted by the photoreceiver is reflected directly in the direction of the optical axis of the photoreceiver and received by the latter after passage through the sensing graticule.

In order to satisfy the ever more demanding requirements of miniaturization, particularly with regard to the width of the sensing unit, or each sensing unit used in the sensor when the latter has several thereof in order to optimize the transfer gain of the optical signals, the selection of the smallest opto-electronic components is preponderant, with, however, a limit inherent in the concurrent geometrical arrangement of the optical axes of the photoemitter and photoreceiver.

The object of the present invention is further to extend the field of the possibilities of miniaturization of sensors of the type to which it refers.

For this purpose, the sensor in accordance with the invention, which is of the type described at the beginning hereof, is characterized by the fact that the photoemitter and the photoreceiver of the sensor unit are arranged alongside of each other, with their optical axes parallel to each other and perpendicular to the plane of the scale in front of an optical group comprising optical means for the focusing and deviation of the light rays coming from the photoemitter in order to recover them on the photoreceiver after their reflection on the graduation of the scale and their passage through the graticule.

In this way, everything being considered equal with regard to the selection of the dimensioning of the opto-electronic components, the combination of the geometrical arrangement of the photoemitter and the photoreceiver in positions with their optical axes parallel, with the focusing and straightening means for the light rays of the optical group, makes it possible to decrease the width of the sensor unit as compared with the known arrangement in which the optical axes of these two components are oblique and concurrent and which thus imposes a greater distance between them.

The accompanying drawing shows, by way of example, two embodiments of the sensor unit which characterizes the object of the invention.

Figure 1:
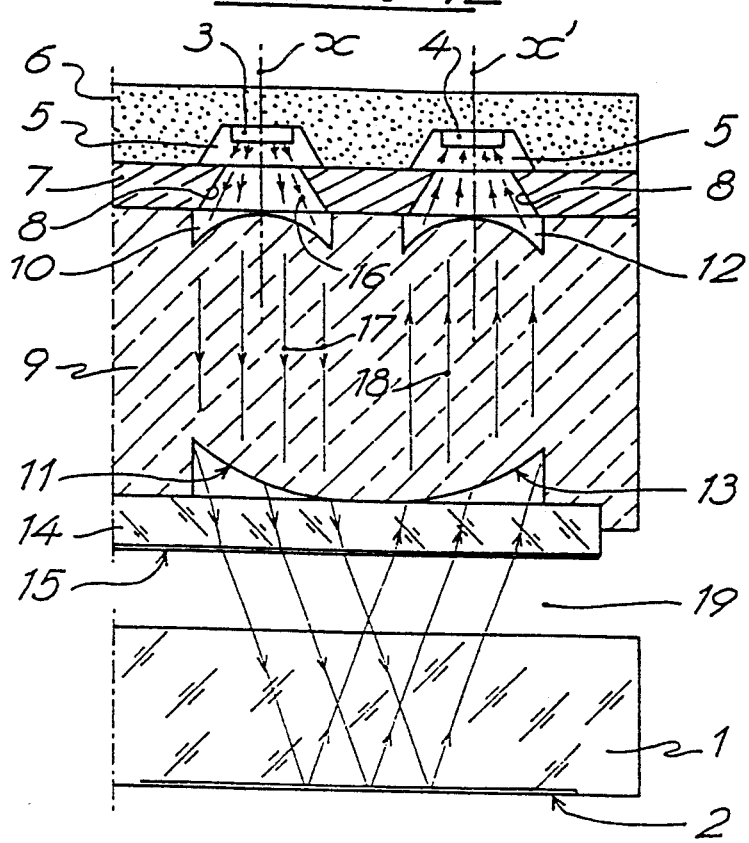
FIG. 1 is a vertical cross section through the first embodiment.

The sensor unit shown in FIG. 1 is shown located above and facing an incremental measurement scale 1 of transparent material, for instance glass, the lower face of which bears a reflective graduation 7, formed, for instance, of a network of equidistant lines resulting from the etching of a fine layer of chromium which are distributed in the direction of relative displacement of said sensor unit with respect to the scale, which is perpendicular here to the plane of the drawing.

This sensor unit comprises, from top to bottom, the following parts:

a photoemitter 3 and an opto-electronic photoreceiver 4 which are fixed with their optical axes x and x' parallel in two adjacent sockets 5 of a printed circuit 6 intended for their connection to a circuit for the feeding and processing of their signals, not shown in the drawing;

a light beam calibration plate 7 having two diaphragms 8, one placed in front of the photoemitter 3 and the other in front of the photoreceiver 4, and centered on the optical axes x and x' of these two elements, an optical group 9 of transparent synthetic material such as, for instance, that known under the trade name of Plexiglass, the opposite two faces of which which are parallel to each other and parallel to the plane of the scale 1, have, aligned on the two optical axes x and x' of the photoemitter 3 and photoreceiver 4, two light-beam focusing and deviating assemblies each formed of a focusing lens 10 and 12 respectively and of a deflection base 11 and 13 respectively; and a graduated graticule 14 of transparent material such as glass for example, bearing a network of equidistant optical lines 15 parallel to each other and of equal or proportional pitch to that of the lines of the graduation 2 of the scale 1 in order to sense the light rays reflected by the latter.

This arrangement, in which the printed circuit 6, the opto-electronic elements 3 and 4, the optical group 9 and the graticule 14 are fastened to each other, the focusing lenses 10 and 12 and the reflection surfaces 11 and 13 are integrated in the optical group 9 by molding of the transparent synthetic material which forms it. The elements of the optical group have as their functions:

to transform the beam of divergent rays 16 emitted by the photoreceiver 3 into a bundle of parallel rays 17 centered on the optical axis x thereof by means of the first lens 10, to deviate the bundle of parallel rays 17 coming from the photoemitter 3 in order to center it on the reflecting graduation 2 of the scale 1 by means of the first deflection face 11, to deviate the beam of parallel rays reflected by the reflecting graduation 2 of the scale 1 and through the graticule 14 in order to direct it and center it on the optical axis x' with the photoreceiver 4 by means of the second deflection face 13, and to focus the beam of parallel rays 18 reflected through the second deflection face 13 onto the photoreceiver 4 by means of the second focusing lens 12.

A sheet of air 19 of predetermined thickness on which the pitch of the etching of the scale 1 and of the graticule 14 depends is provided, in customary manner, between these two parts.

In order to assure a low consumption of energy, the opto-electronic elements can be selected preferably in infrared technology, for instance an IR photodiode for the photoemitter 3 and an IR phototransistor for the photoreceiver 4, but this choice is obviously not limitative.

The calibration diaphragms 8 placed in front of the opto-electronic elements 3 and 4 are used here in order to increase the optical efficiency, but they are not indispensable.

Moreover, the composition of the optical group 9 is not limitative either, and other arrangements can be employed without going beyond the scope of the invention. Thus, for instance, separate optical elements suitable for the same effects can be mounted in a housing or inserted in the support.

Furthermore, the two deflection faces 11 and 13 can be formed of two oblique faces of a prism, the upper edge of which would be located in a plane perpendicular to the plane containing the two optical axes x and x' and midway between these two axes, the two lenses 10 and 12 being on their part on inverse curvature, convex instead of concave, facing each of these two faces.

Likewise, the two focusing and deviating assemblies for the light rays, formed of the two focusing lenses 10 and 12 and the two deflection faces 11 and 13 can be replaced by a single bi-convex lens extending below the two opto-electronic elements 3 and 4, the optical axis of which would be located in position parallel to and midway between the two optical axes x and x' of these two elements, the combination of the optical effects of deviation of the light rays of the two opposite faces of this lens being adapted to obtain the same terminal depth.

Figure 2:
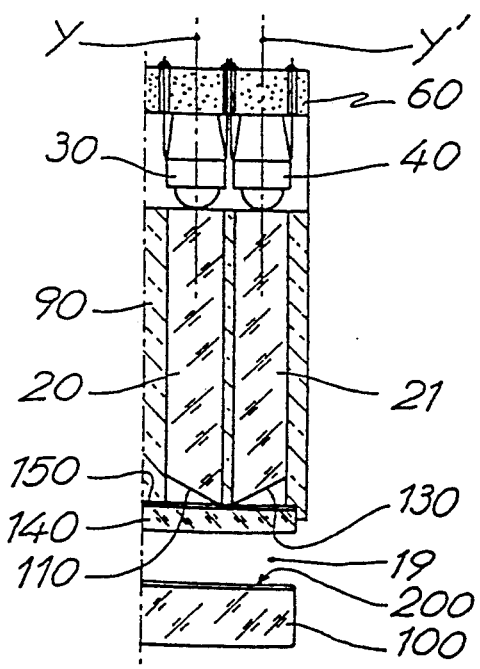
FIG. 2 is a vertical cross section through the second embodiment.

The second embodiment, shown in FIG. 2, employs a different arrangement, which is characterized by its simplicity.

The sensing unit, in this case, also comprises a photoemitter 30 and a photoreceiver 40, in the present case an IR photodiode and phototransistor, which are located alongside of each other with parallel positions of their optical axes y and y', and a printed circuit 60, which also bears the electrical connections necessary for the processing of their signals.

The optical group of this sensor unit comprises here two waveguides 20 and 21 which are parallel to each other, the first 20 being aligned on the optical axis y of the photoemitter 30 and the second 21 being aligned on the optical axis y' of the photoreceiver 40. The two waveguides 20 and 21 are inserted into a support 90, for instance in this case also of transparent synthetic material, and each of them has at its base an oblique deflection face 110 and 130 respectively, facing with the graduation 150 of a sensing graticule 140 is placed.

Facing the optical group, separated from it by a sheet of air 19, there is arranged a measurement scale 100 with its reflecting graduation 200.

In this arrangement, the two waveguides 20 and 21, which transmit the light rays by total reflection, can be formed, for instance, of two lengths of optical fiber.

By these means at the outlet of the first waveguide 20 and by its deflection face 110 the light rays coming from the photoemitter 30 are diverted onto the reflecting graduation 200 of the scale 100 and the light rays reflected by the latter are diverted, at the entrance of the second wave guide 21 by its deflection face 130 towards the photoreceiver 40.

I claim:

1. An opto-electronic sensor for measuring linear values by reflection of light rays, comprising at least one sensor unit arranged on one side of and facing an incremental measurement scale with reflecting graduation and comprising an opto-electronic photoemitter arranged to irradiate the reflecting graduation of the scale, a graduated graticule arranged to sense the luminous rays reflected by the graduation of the scale, and an opto-electronic photoreceiver arranged to detect the light rays reflected through the graticule, characterized by the fact that the photoemitter (3, 30) and the photoreceiver (4, 40) of the sensor unit are arranged alongside of each other with their optical axes (xx', yy') parallel to each other and perpendicular to the plane of the scale in front of an optical group (9, 90) comprising means for focusing (10, 12-20, 21) and deviating (11, 13-110, 130) light rays coming from the photoemitter in order to recover them on the photoreceiver after their reflection on the graduation of the scale and their passage through the graticule (14, 140) the optical group (9) of the sensor unit comprises, aligned on the two optical axes (x, x') of the photoemitter and the photoreceiver, two light ray focusing and deviating assemblies each formed of a focusing lens (10, 12) and of a deflection face (11, 13) which are spaced apart from each other and between which the light rays emitted by the photoemitter and those reflected by the reflecting graduation of the scale are parallel to the said two optical axes (xx').

2. An opto-electronic sensor for measuring linear values by reflection of light rays, comprising at least one sensor unit arranged on one side of and facing an incremental measurement scale with reflecting graduation and comprising an opto-electronic photoemitter arranged to irradiate the reflecting graduation of the scale, a graduated graticule arranged to sense the luminous rays reflected by the graduation of the scale, and an opto-electronic photoreceiver arranged to detect the light rays reflected through the graticule, characterized by the fact that the photoemitter (3, 30) and the photoreceiver (4, 40) of the sensor unit are arranged alongside of each other with their optical saxes (xx', yy') parallel to each other and perpendicular to the plane of the scale in front of an optical group (9, 90) comprising means for focusing (10, 12-20, 21) and deviating (11, 13-110, 130) light rays coming from the photoemitter in order to recover them on the photoreceiver after their reflection on the graduation of the scale and their passage through the graticule (14, 140), the optical group (9) of the sensor unit comprises two waveguides (20, 21) which are parallel to each other, the first (2) being aligned on the optical axis (y) of the photoemitter (30) and the second (21) on the optical axis (y') of the photoreceiver (40), and by the fact that each of these two waveguides has a deflection face (110, 130) to deviate, on the one hand, the light rays coming from the photoemitter at the outlet of the first waveguide on the reflecting graduation of the scale and, on the other hand, to deviate the light rays reflected by the said graduation at the inlet of the second waveguide towards the photoreceiver.

* * * * *